US011532175B1

(12) United States Patent
Gruhlke et al.

(10) Patent No.: US 11,532,175 B1
(45) Date of Patent: Dec. 20, 2022

(54) IMAGING AN OBJECT ON A DISPLAY

(71) Applicant: QUALCOMM Incorporated, San Diego, CA (US)

(72) Inventors: Russell Gruhlke, San Jose, CA (US); Ravishankar Sivalingam, San Jose, CA (US); Donald William Kidwell, Campbell, CA (US); Edwin Chongwoo Park, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/303,241

(22) Filed: May 25, 2021

(51) Int. Cl.
  *G06V 40/13* (2022.01)
  *G06F 21/32* (2013.01)
  *G06V 10/141* (2022.01)
  *G06V 10/143* (2022.01)
  *G06V 40/40* (2022.01)

(52) U.S. Cl.
  CPC .......... *G06V 40/1318* (2022.01); *G06F 21/32* (2013.01); *G06V 10/141* (2022.01); *G06V 10/143* (2022.01); *G06V 40/45* (2022.01)

(58) Field of Classification Search
  CPC ............. G06V 40/1318; G06V 10/141; G06V 10/143; G06V 40/45; G06V 40/1382; G06F 21/32
  See application file for complete search history.

(56) References Cited

U.S. PATENT DOCUMENTS

| 10,963,671 | B2 | 3/2021 | Pi et al. | |
| 11,048,909 | B2* | 6/2021 | Lin | G06V 40/1306 |
| 2006/0244947 | A1* | 11/2006 | Rowe | G06V 40/1324 |
| | | | | 356/71 |
| 2016/0078274 | A1* | 3/2016 | Tuneld | G06V 10/993 |
| | | | | 382/124 |
| 2016/0283772 | A1* | 9/2016 | Nelson | G06V 40/1324 |
| 2019/0042825 | A1* | 2/2019 | He | G09G 3/3233 |
| 2020/0083302 | A1* | 3/2020 | Park | H01L 51/5218 |
| 2020/0408982 | A1* | 12/2020 | Kallassi | G02B 6/0036 |
| 2021/0056286 | A1* | 2/2021 | Cheng | G06V 40/1365 |
| 2021/0117522 | A1* | 4/2021 | He | G06F 21/32 |

FOREIGN PATENT DOCUMENTS

WO  2017214582 A1  12/2017

OTHER PUBLICATIONS

International Search Report and Written Opinion—PCT/US2022/071442—ISA/EPO—dated Jul. 1, 2022.

* cited by examiner

*Primary Examiner* — Stephen G Sherman
(74) *Attorney, Agent, or Firm* — Qualcomm Incorporated

(57) ABSTRACT

In some aspects, a device may detect that an object is contacting a display of the device. The device may illuminate, based at least in part on detecting that the object is contacting the display, a plurality of pixel regions of the display. The plurality of pixel regions may be illuminated sequentially. The device may obtain, using one or more photosensors, a set of data relating to light that is reflected from at least a portion of the object based at least in part on illuminating the plurality of pixel regions. The set of data may include respective data for each sequential illumination of the plurality of pixel regions. The device may generate an image of at least the portion of the object based at least in part on the set of data. Numerous other aspects are described.

30 Claims, 7 Drawing Sheets

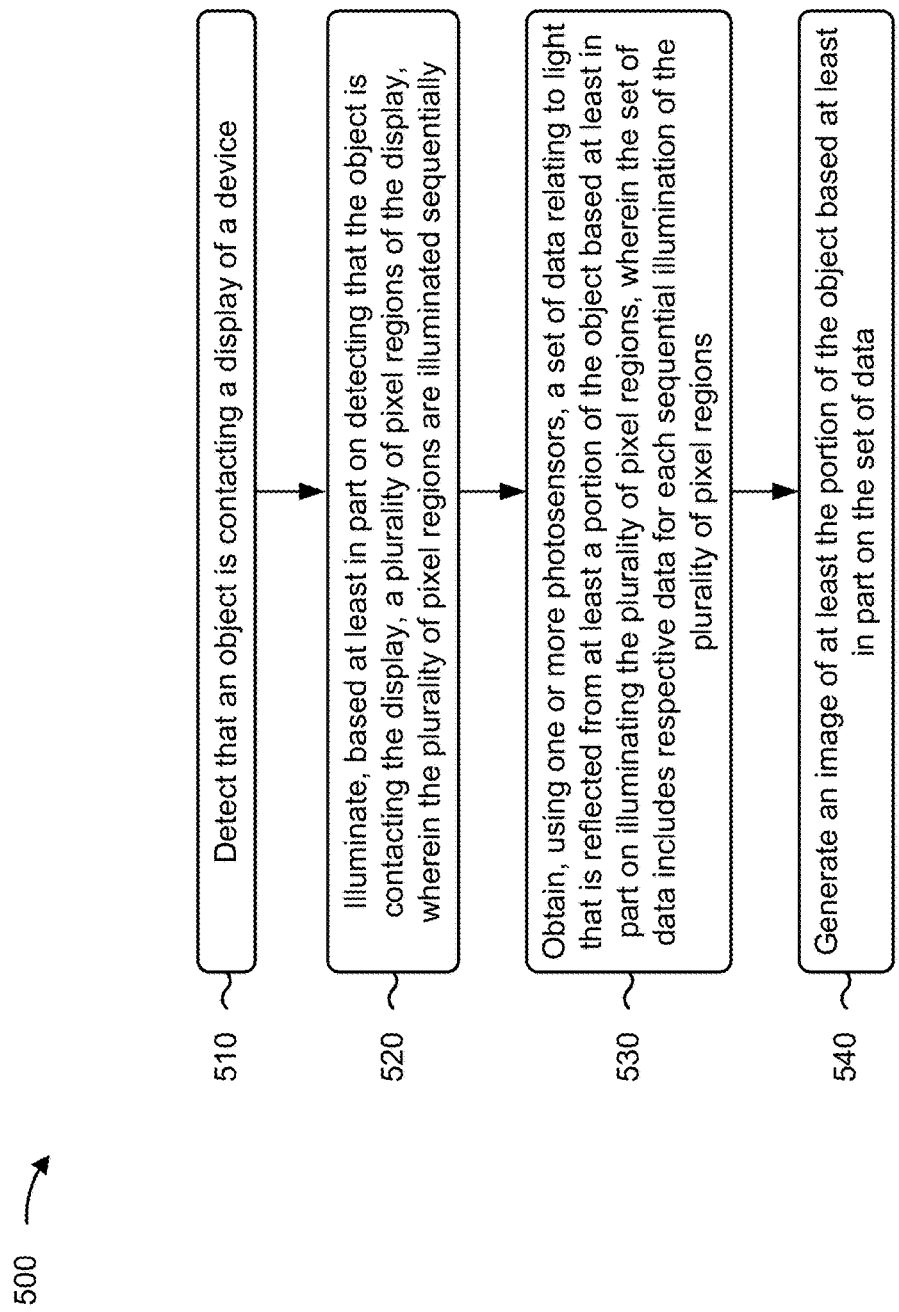

IMAGING AN OBJECT ON A DISPLAY

FIELD OF THE DISCLOSURE

Aspects of the present disclosure generally relate to imaging and, for example, to imaging an object on a display.

BACKGROUND

Biometric authentication is used as a form of identification and access control. Biometric identifiers are the distinctive, measurable characteristics used to label and describe individuals. Biometric identifiers include physiological characteristics related to the shape of the body. For example, a commonly used biometric identifier is a fingerprint.

SUMMARY

In some aspects, a method includes detecting, by a device, that an object is contacting a display of the device; illuminating, by the device, based at least in part on detecting that the object is contacting the display, a plurality of pixel regions of the display, wherein the plurality of pixel regions are illuminated sequentially; obtaining, by the device, using one or more photosensors, a set of data relating to light that is reflected from at least a portion of the object based at least in part on illuminating the plurality of pixel regions, wherein the set of data includes respective data for each sequential illumination of the plurality of pixel regions; and generating, by the device, an image of at least the portion of the object based at least in part on the set of data.

In some aspects, a device includes a light-passing layer; one or more emitters configured to emit light through the light-passing layer, wherein the one or more emitters are configured to illuminate a plurality of pixels of a display; and one or more photosensors optically coupled to an edge of the light-passing layer, wherein the one or more photosensors are configured to detect the light reflected from an object and guided to the one or more photosensors via the light-passing layer.

In some aspects, a non-transitory computer-readable medium storing a set of instructions includes one or more instructions that, when executed by one or more processors of a device, cause the device to: detect that an object is contacting a display of the device; illuminate, based at least in part on detecting that the object is contacting the display, a plurality of pixel regions of the display, wherein the plurality of pixel regions are illuminated sequentially; obtain, using one or more photosensors, a set of data relating to light that is reflected from at least a portion of the object based at least in part on illuminating the plurality of pixel regions, wherein the set of data includes respective data for each sequential illumination of the plurality of pixel regions; and generate an image of at least the portion of the object based at least in part on the set of data.

In some aspects, an apparatus includes means for detecting that an object is contacting a display of the device; means for illuminating, based at least in part on detecting that the object is contacting the display, a plurality of pixel regions of the display, wherein the plurality of pixel regions are illuminated sequentially; means for obtaining, using one or more photosensors, a set of data relating to light that is reflected from at least a portion of the object based at least in part on illuminating the plurality of pixel regions, wherein the set of data includes respective data for each sequential illumination of the plurality of pixel regions; and means for generating an image of at least the portion of the object based at least in part on the set of data.

Aspects generally include a method, apparatus, system, computer program product, non-transitory computer-readable medium, user device, user equipment, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 5 is a flowchart of an example process associated with imaging an object on a display, in accordance with the present disclosure.

DETAILED DESCRIPTION

Figure 1:
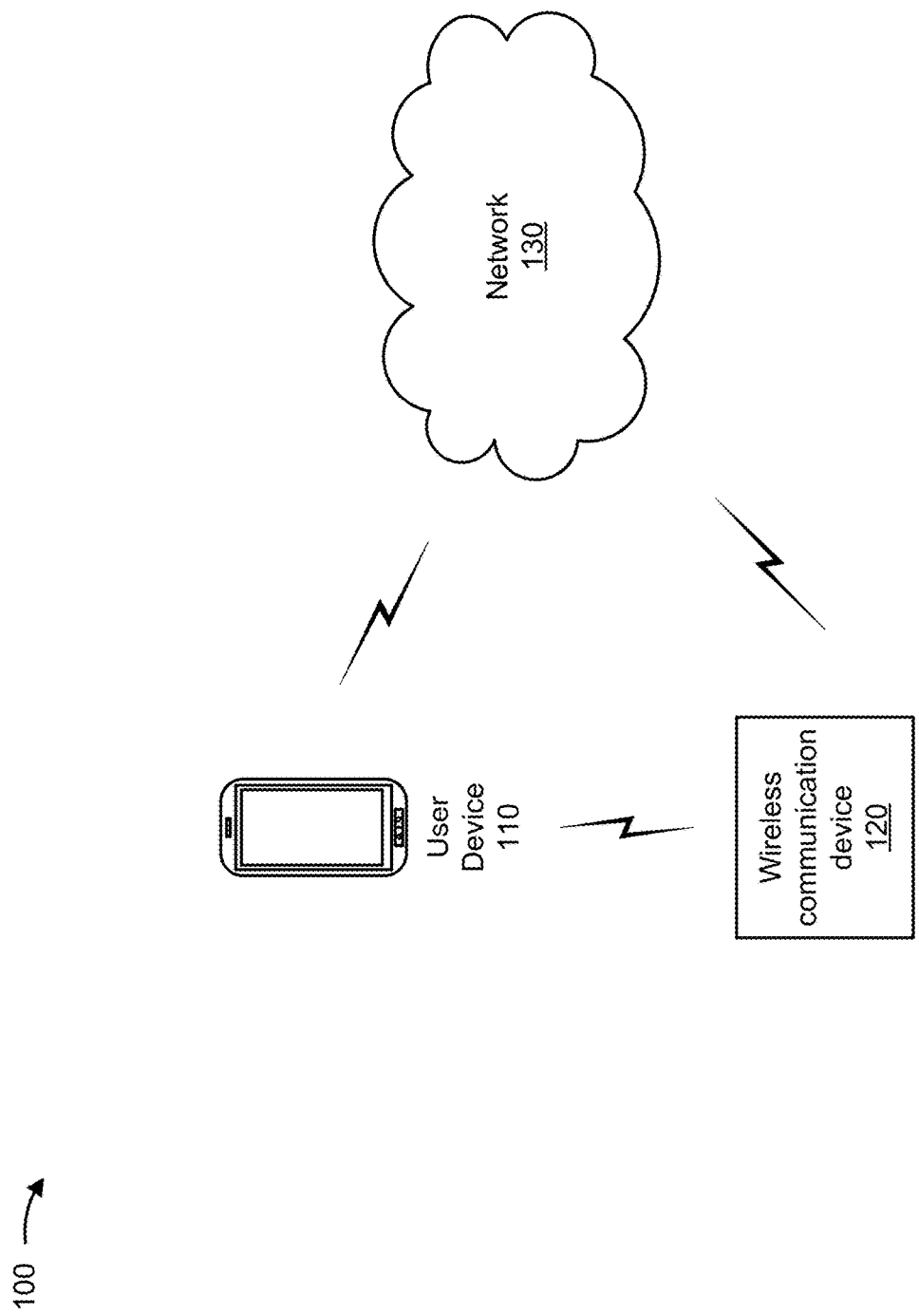
FIG. 1 is a diagram of an example environment in which systems and/or methods described herein may be implemented, in accordance with the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

A mobile device, such as a smartphone, may use various techniques to control access to functions of the mobile device. For example, the mobile device may obtain fingerprint information (e.g., an image of a fingerprint, data representative of a fingerprint, or the like) of a user of the mobile device in order to authenticate the user for accessing functions of the mobile device. In some cases, the mobile device may include a sensor in a bezel (e.g., a frame) located along a perimeter of a display of the mobile device, and the sensor may be used by the mobile device to obtain the fingerprint information. However, many mobile devices have reduced the size of the bezel, or eliminated the bezel altogether, in order to provide for increased display size.

In some cases, fingerprinting of a user of a mobile device may be performed on the display of the mobile device using optical and/or ultrasonic techniques. For example, the user may place a fingertip on the display, and the mobile device may scan the fingertip to obtain fingerprint information via the display. In one example, a sensor (e.g., a multi-pixel image sensor used with one or more lenses, or an ultrasound sensor) may be located beneath the display of the mobile device, and fingerprinting of the user may be performed by the user placing a fingertip on a particular area of the display corresponding to the location of the sensor. Thus, the fingerprinting area of the display is localized and fingertip placement outside of the fingerprinting area may result in multiple failed authentication attempts, thereby consuming excessive processing resources in connection with the multiple authentication attempts. Moreover, the use of a multi-pixel image sensor (e.g., a multi-pixel camera) with one or more lenses to obtain fingerprint information adds complexity to the mobile device, requires that the mobile device accommodate a particular path for light to travel to reach the image sensor, and/or may necessitate increased form factor. In another example, an array of sensors may be located beneath the display of the mobile device to provide coverage for an entire area (or a greater area) of the display. However, the quantity of sensors necessary to provide coverage for the entire area of the display is prohibitive and substantially increases the complexity of the mobile device.

Some techniques and apparatuses described herein provide for imaging of an object, such as a finger of a user, that is placed anywhere on a display of a device. The device may include one or more photosensors (e.g., lens-less, single-pixel photosensors) located along a light-passing layer (e.g., cover glass) of a display of the device. The device may sequentially illuminate a plurality of pixel regions of the display. Light reflected from the object for each sequential illumination is guided to the one or more photosensors using the light-passing layer as a light guide. The device may obtain a set of data relating to the reflected light for each sequential illumination of a pixel region of the plurality of pixel regions. The device may generate an image of at least a portion of the object based at least in part on the set of data that is obtained. The device may perform one or more operations, such as authenticating the user, based at least in part on the image that is generated.

In this way, the device may image an object that is placed on the display using relatively few photosensors that are simple in design, and without needing to accommodate a particular path for light to travel to reach the one or more photosensors. Moreover, the device may use the entire area of the display for imaging. In particular, to provide coverage for the entire area of the display, the device may include a quantity of photosensors that is uncorrelated to the size of the display (e.g., increasing the coverage area of the imaging does not require increasing the quantity of photosensors). Accordingly, the device is not overly complex and can employ a compact form factor. Moreover, as the device is enabled for imaging over the entire area of the display, the device eliminates imaging failures resulting from improperly locating an object on the display, thereby conserving processing resources of the device that may otherwise be used for multiple failed imaging attempts.

FIG. 1 is a diagram of an example environment 100 in which systems and/or methods described herein may be implemented. As shown in FIG. 1, environment 100 may include a user device 110, a wireless communication device 120, and a network 130. Devices of environment 100 may interconnect via wired connections, wireless connections, or a combination of wired and wireless connections.

The user device 110 includes one or more devices capable of receiving, generating, storing, processing, and/or providing information associated with imaging of an object contacting a display of the user device 110, as described elsewhere herein. The user device 110 may include a communication device and/or a computing device. For example, the user device 110 may include a wireless communication device, a mobile phone (e.g., a smartphone), a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

Similar to user device 110, wireless communication device 120 includes one or more devices capable of receiving, generating, storing, processing, and/or providing information associated with imaging of an object contacting a display of the user device 110. For example, wireless communication device 120 may include a base station, an access point, or the like. Additionally, or alternatively, similar to user device 110, wireless communication device 120 may include a communication device and/or computing device, such as a wireless communication device, a mobile phone, a user equipment, a laptop computer, a tablet computer, a desktop computer, a gaming console, a set-top box, a wearable communication device, or a similar type of device. In some aspects, wireless communication device 120 may receive an image, or information relating to the image, from user device 110, wireless communication device 120 may process the image, or the information relating to the image, and/or wireless communication device 120 may transmit, based at least in part on the processing, information, an image, or the like, to user device 110.

The network 130 includes one or more wired and/or wireless networks. For example, the network 130 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 130 enables communication among the devices of environment 100.

The quantity and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of environment 100 may perform one or more functions described as being performed by another set of devices of environment 100.

Figure 2:
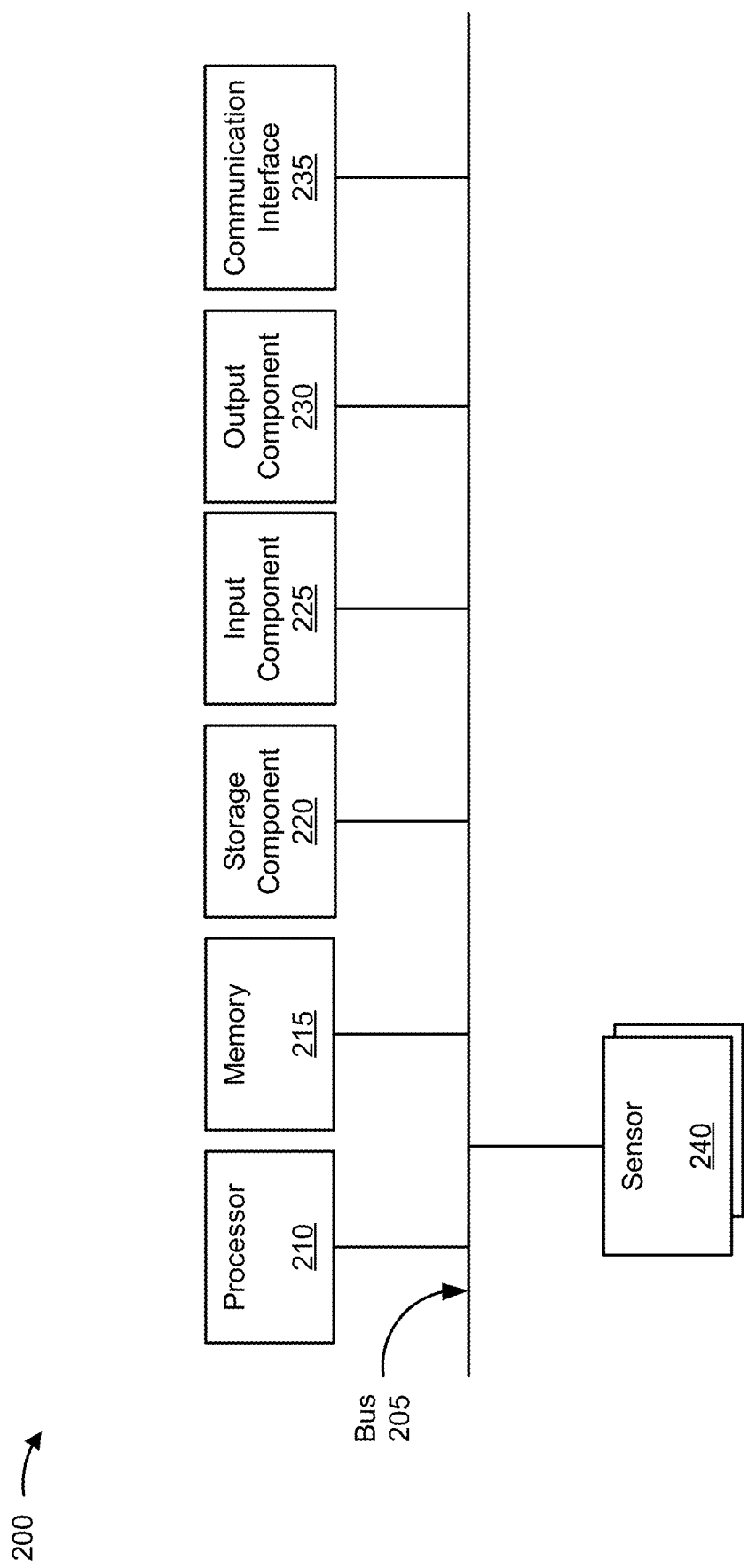
FIG. 2 is a diagram of example components of a device, in accordance with the present disclosure.

FIG. 2 is a diagram of example components of a device 200, in accordance with the present disclosure. Device 200 may correspond to user device 110 and/or wireless communication device 120. In some aspects, user device 110 and/or wireless communication device 120 may include one or more devices 200 and/or one or more components of device 200. As shown in FIG. 2, device 200 may include a bus 205, a processor 210, a memory 215, a storage component 220, an input component 225, an output component 230, a communication interface 235, and/or one or more sensors 240.

Bus 205 includes a component that permits communication among the components of device 200. Processor 210 is implemented in hardware, firmware, or a combination of hardware and software. Processor 210 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some aspects, processor 210 includes one or more processors capable of being programmed to perform a function. Memory 215 includes a random access memory (RAM), a read only memory (ROM), and/or another type of dynamic or static storage device (e.g., a flash memory, a magnetic memory, and/or an optical memory) that stores information and/or instructions for use by processor 210.

Storage component 220 stores information and/or software related to the operation and use of device 200. For example, storage component 220 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 225 includes a component that permits device 200 to receive information, such as via user input (e.g., a touch screen display, a keyboard, a keypad, a mouse, a button, a switch, and/or a microphone). Additionally, or alternatively, input component 225 may include a component for determining a position or a location of device 200 (e.g., a global positioning system (GPS) component or a global navigation satellite system (GNSS) component) and/or a sensor for sensing information (e.g., an accelerometer, a gyroscope, an actuator, or another type of position or environment sensor). Output component 230 includes a component that provides output information from device 200 (e.g., a display, a speaker, a haptic feedback component, and/or an audio or visual indicator).

Communication interface 235 includes a transceiver-like component (e.g., a transceiver and/or a separate receiver and transmitter) that enables device 200 to communicate with other devices, such as via a wired connection, a wireless connection, or a combination of wired and wireless connections. Communication interface 235 may permit device 200 to receive information from another device and/or provide information to another device. For example, communication interface 235 may include an Ethernet interface, an optical interface, a coaxial interface, an infrared interface, a radio frequency interface, a universal serial bus (USB) interface, a wireless local area interface (e.g., a Wi-Fi interface), and/or a cellular network interface.

Sensor 240 includes one or more devices capable of sensing characteristics associated with device 200 and/or associated with an environment of device 200. Sensor 240 may include a photosensor, such as a photodiode. For example, sensor 240 may include a single-pixel photosensor (e.g., a single-pixel camera) and/or a lens-less photosensor (e.g., a lens-less camera).

Device 200 may perform one or more processes described herein. Device 200 may perform these processes based on processor 210 executing software instructions stored by a non-transitory computer-readable medium, such as memory 215 and/or storage component 220. A computer-readable medium is defined herein as a non-transitory memory device. A memory device includes memory space within a single physical storage device or memory space spread across multiple physical storage devices.

Software instructions may be read into memory 215 and/or storage component 220 from another computer-readable medium or from another device via communication interface 235. When executed, software instructions stored in memory 215 and/or storage component 220 may cause processor 210 to perform one or more processes described herein. Additionally, or alternatively, hardwired circuitry may be used in place of or in combination with software instructions to perform one or more processes described herein. Thus, aspects described herein are not limited to any specific combination of hardware circuitry and software.

In some aspects, device 200 includes means for performing one or more processes described herein and/or means for performing one or more operations of the processes described herein. For example, device 200 may include means for detecting that an object is contacting a display of the device; means for illuminating, based at least in part on detecting that the object is contacting the display, a plurality of pixel regions of the display, wherein the plurality of pixel regions are illuminated sequentially; means for obtaining, using one or more photosensors, a set of data relating to light that is reflected from at least a portion of the object based at least in part on illuminating the plurality of pixel regions, wherein the set of data includes respective data for each sequential illumination of the plurality of pixel regions; and/or means for generating an image of at least the portion of the object based at least in part on the set of data. In some aspects, such means may include one or more components of device 200 described in connection with FIG. 2, such as bus 205, processor 210, memory 215, storage component 220, input component 225, output component 230, communication interface 235, and/or sensor 240.

The quantity and arrangement of components shown in FIG. 2 are provided as an example. In practice, device 200 may include additional components, fewer components, different components, or differently arranged components than those shown in FIG. 2. Additionally, or alternatively, a set of components (e.g., one or more components) of device 200 may perform one or more functions described as being performed by another set of components of device 200.

Figure 3:
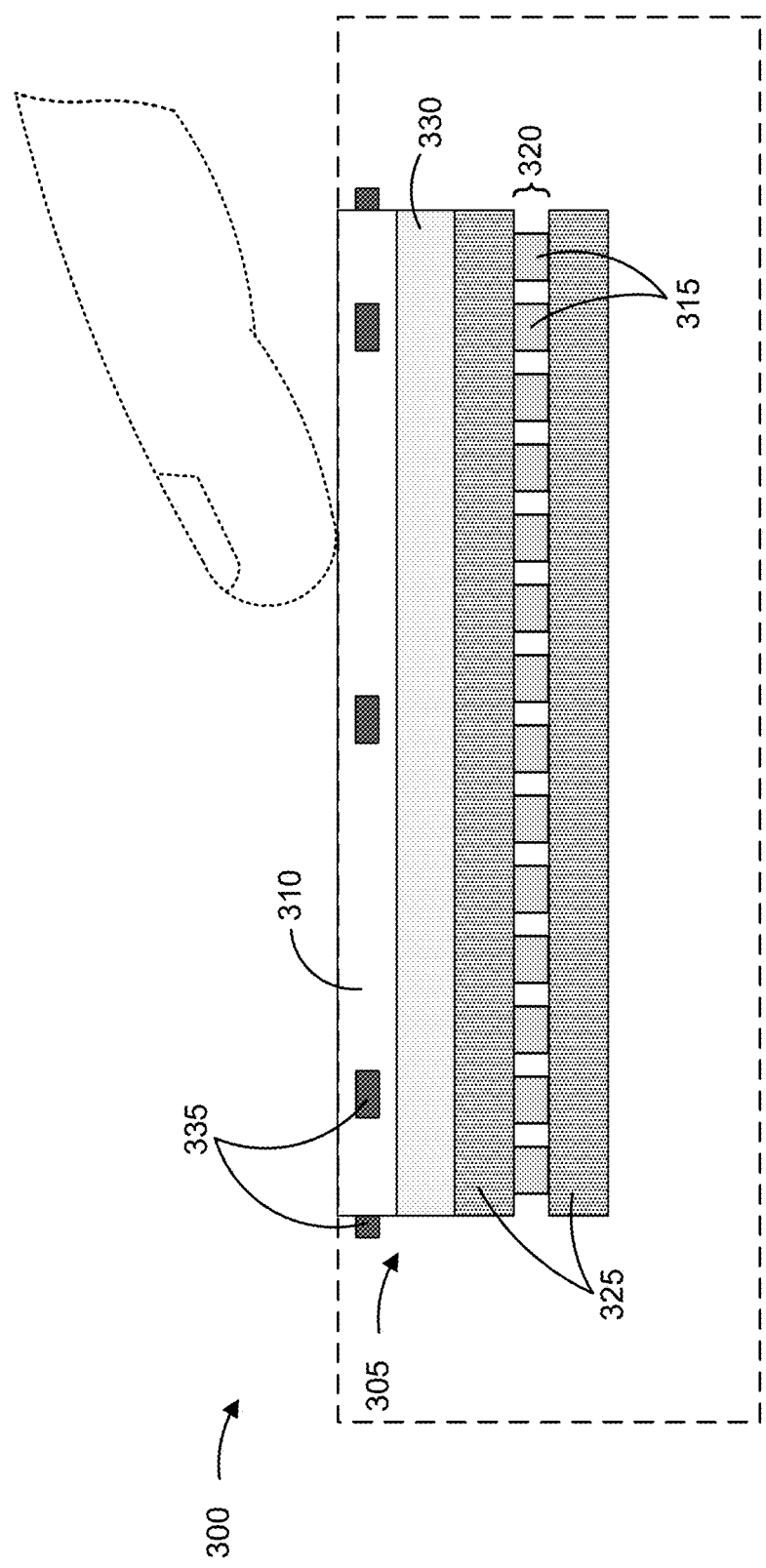
FIG. 3 is a diagram of a cross-sectional view of an example device, in accordance with the present disclosure.

FIG. 3 is a diagram of a cross-sectional view of an example device 300, in accordance with the present disclosure. The device 300 may correspond to the user device 110.

For example, the device 300 may be a wireless communication device, such as a smartphone.

The device 300 may include a display 305. For example, the display 305 may be adjoined to a housing of the device 300. The display 305 may be any type of display that includes a light-passing layer 310 and one or more emitters 315, as described herein. For example, the display 305 may include a liquid crystal display (LCD) or an organic light-emitting diode (OLED) display, among other examples. In addition, the display 305 may be a touchscreen display. In some aspects, the display 305 may occupy 80% or more, 85% or more, 90% or more, 95% or more, or 99% or more, of an area of a display-side surface of the device 300. The device 300 is shown in FIG. 3 with a finger in contact with the display 305 (e.g., to manipulate the display 305 via a touchscreen interface).

The light-passing layer 310 is configured to permit light to pass through the light-passing layer 310. For example, the light-passing layer may be a transparent layer. In some aspects, the light-passing layer 310 includes glass (e.g., clear glass) and/or plastic (e.g., clear plastic). For example, the light-passing layer 310 may include a cover glass of the display 305. In some aspects, one or more layers of the display 305, such as a film layer, a screen protector layer, or the like, may be disposed on the light-passing layer 310.

The light-passing layer 310 may be in the form of a plate (e.g., a rectangular plate). For example, the light-passing layer 310 may include opposite planar surfaces through which images of the display 305 are projected, and an edge (shown in FIG. 3) defined between (e.g., at a periphery of) the planar surfaces.

The display 305 may include an emitter layer 320. The emitter layer 320 may include the one or more emitters 315. In some aspects, the emitter layer 320 may include a substrate on which the emitters 315 are disposed and/or one or more layers (e.g., epitaxial layers) in which the emitters 315 are formed.

The emitters 315 include one or more devices configured to emit light through the light-passing layer 310. For example, the emitters 315 may include a plurality of light-emitting diodes (LEDs), a plurality of OLEDs, or the like. The emitters 315 may be configured to illuminate a plurality of pixels of the display 305. In some aspects, each emitter 315 may illuminate a respective pixel of the display 305. In some aspects, an emitter 315 may illuminate multiple pixels of the display 305. A "pixel" may refer to a smallest element of the display 305 for which illumination can be controlled. For an OLED display, a pixel may correspond to an emitter 315 (e.g., an OLED). For an LCD, a pixel may correspond to an electrically-controllable area of a liquid crystal layer of the LCD.

The display 305 may include one or more additional layers 325. The one or more additional layers 325 may be between the light-passing layer 310 and the emitter layer 320 and/or beneath the emitter layer 320. The one or more additional layers 325 may include one or more substrate layers, one or more film layers (e.g., polarizer film layers), one or more thin-film transistor (TFT) layers, one or more liquid crystal layers, one or more electrode layers, one or more color filter layers, one or more projected capacitive touch layers, or the like.

The display 305 may include an adhesive layer 330. The adhesive layer 330 may be between the light-passing layer 310 and the emitter layer 320. For example, the adhesive layer 330 may be between the light-passing layer 310 and the one or more additional layers 325 that are above the emitter layer 320. The adhesive layer 330 may include an adhesive (e.g., a pressure sensitive adhesive, such as a silicone adhesive) that affixes the light-passing layer 310 to another layer of the display 305 (e.g., one of the additional layers 325 or the emitter layer 320).

The adhesive layer 330 may have a lower refractive index than the light-passing layer 310. For example, the light-passing layer 310 may have a refractive index in a range from 1.45 to 1.55, such as a refractive index of about (e.g., ±1%) 1.5; the adhesive layer 330 may have a refractive index in a range from 1.35 to 1.45, such as a refractive index of about 1.4. In this way, total internal reflection in the light-passing layer 310 may be achieved, and the light-passing layer 310 may also function as a light guide, as described herein.

The layers of the display 305 are shown in FIG. 3 for illustration purposes. In practice, the layers may have different relative thicknesses from that shown in FIG. 3. Moreover, in practice, the display 305 may include a different quantity of layers or a different arrangement of layers from that shown in FIG. 3.

The device 300 may include one or more (e.g., a plurality of) photosensors 335. The photosensors 335 may correspond to the sensors 240, described herein. For example, the photosensors 335 may be photodiodes. Moreover, the photosensors 335 may be single-pixel photosensors (e.g., single-pixel cameras). That is, a photosensor 335 may include only a single pixel (e.g., a single photosite) for light detection. Additionally, or alternatively, the photosensors 335 may be lens-less photosensors. That is, a photosensor 335 may not use a lens to organize light prior to detection of the light at the photosensor 335. In some aspects, the photosensors 335 may include a first set of photosensors 335 configured to (e.g., filtered to) only detect light of a first wavelength (e.g., a red light wavelength), a second set of photosensors 335 configured to (e.g., filtered to) only detect light of a second wavelength (e.g., a green light wavelength), and a third set of photosensors 335 configured to (e.g., filtered to) only detect light of a third wavelength (e.g., a blue light wavelength).

The photosensors 335 may be optically coupled to an edge of the light-passing layer 310. For example, the photosensors 335 may be adjoined to the edge of the light-passing layer 310. In some aspects, the light-passing layer 310 is rectangular and has four edges, and the photosensors 335 may be optically coupled to at least one edge (e.g., one edge, two edges, three edges, or all four edges) of the light-passing layer 310. In this way, light (e.g., some of the light) reflected (e.g., scattered) from an object that is contacting the display 305 (e.g., contacting the light-passing layer 310) is trapped in the light-passing layer 310 and guided to the photosensors 335. In other words, the photosensors 335 are configured to detect light that is reflected from the object and guided to the photosensors 335 via the light-passing layer 310.

In some aspects, the photosensors 335 may be optically-coupled to another portion (e.g., a planar surface) of the light-passing layer 310. In some aspects, the photosensors 335 may be located beneath the emitter layer 320. For example, a photosensor 335 may be in optical alignment with a gap between two emitters 315 (e.g., in connection with an OLED display).

As indicated above, FIG. 3 is provided as an example. Other examples may differ from what is described with respect to FIG. 3.

Figure 4A:
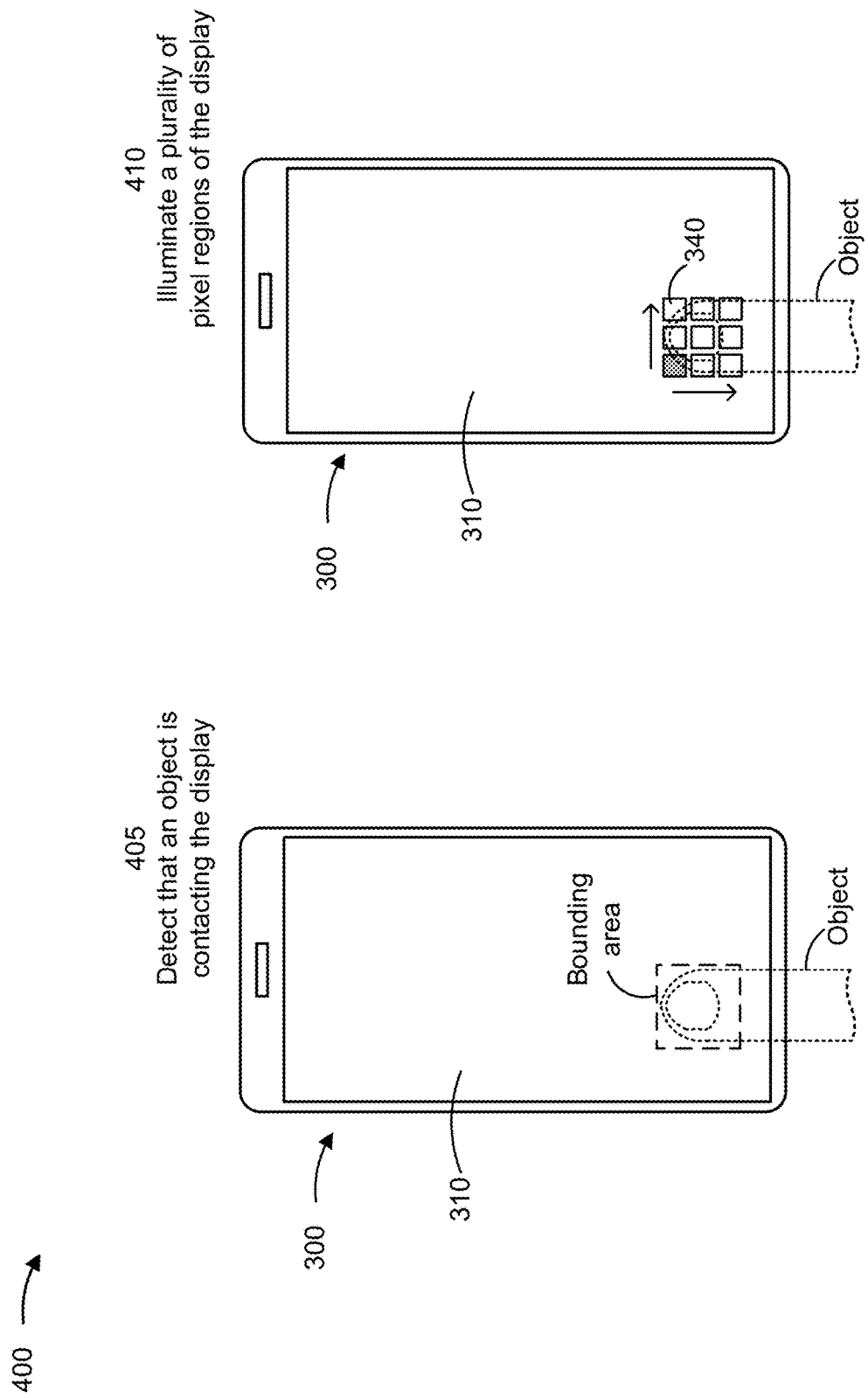
FIGS. 4A-4C are diagrams illustrating an example associated with imaging an object on a display, in accordance with the present disclosure
Figure 4B:
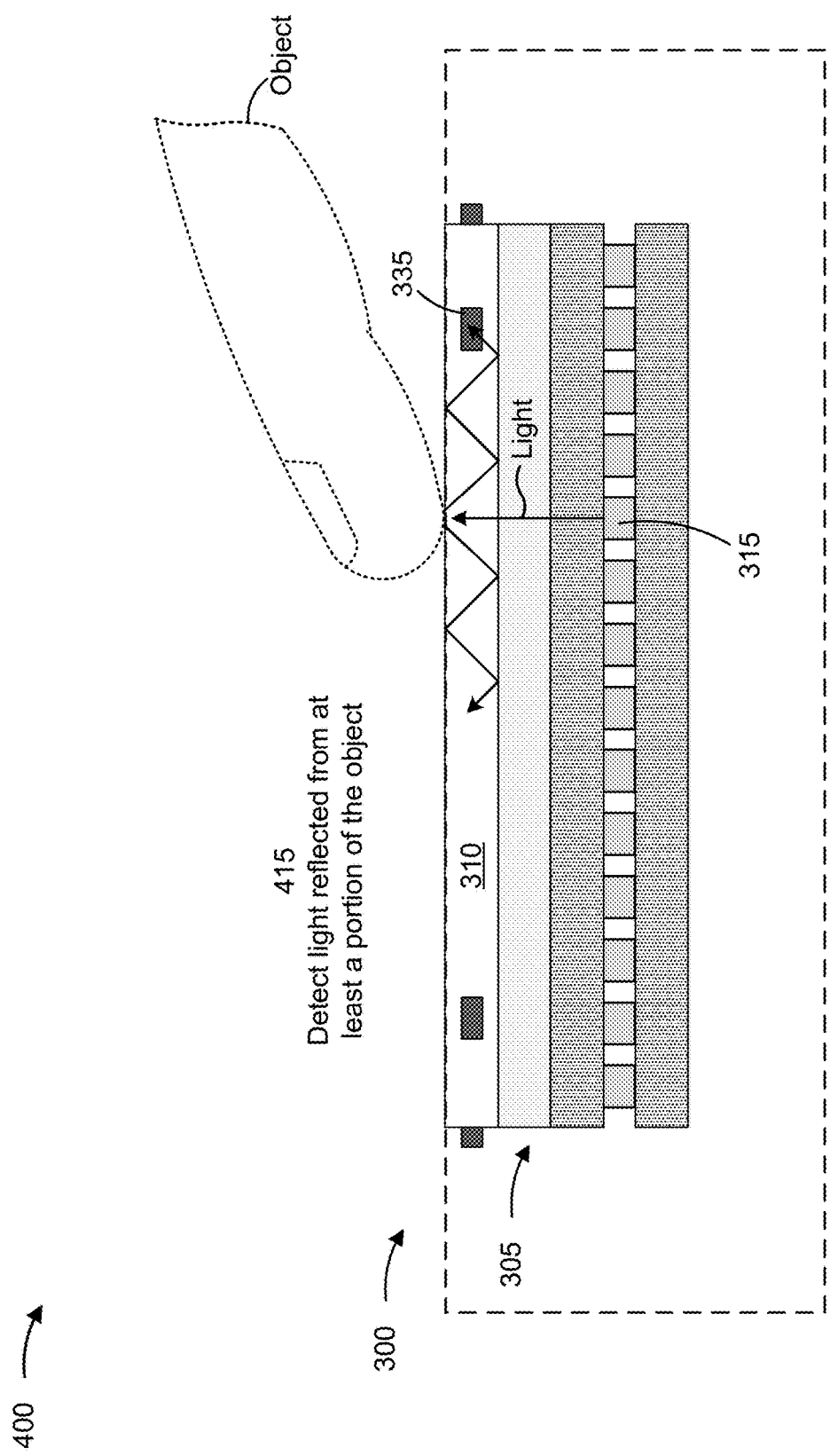
Figure 4C:
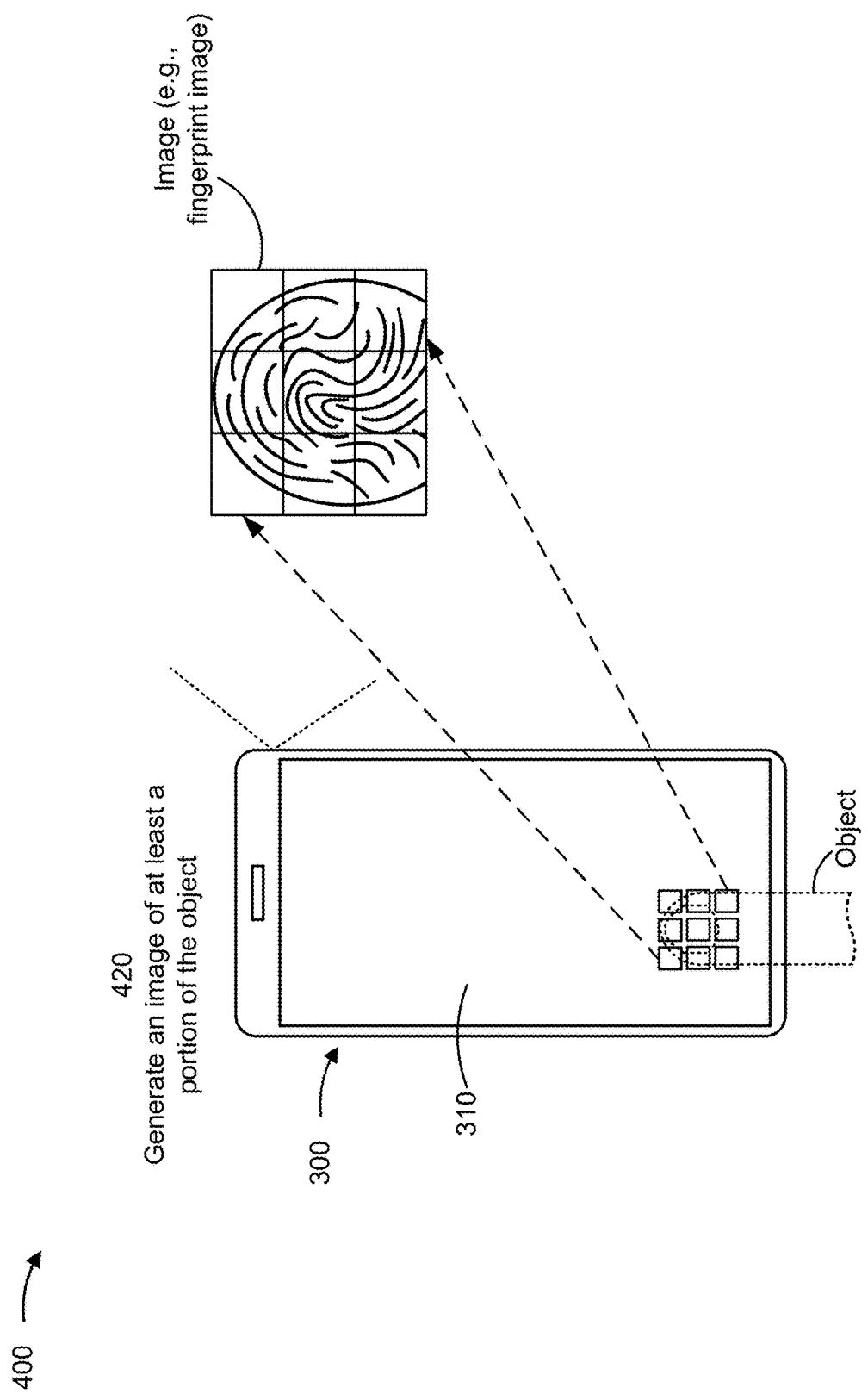

FIGS. 4A-4C are diagrams illustrating an example 400 associated with imaging an object on a display, in accordance with the present disclosure. As shown in FIGS. 4A-4C, example 400 includes the device 300.

As shown in FIG. 4A, and by reference number 405, the device 300 may detect that an object is contacting the display 305 (the light-passing layer 310 of the display 305 is shown in FIG. 4A) of the device 300. For example, the object may be touching the display 305 (e.g., the light-passing layer 310), placed on the display 305 (e.g., the light-passing layer 310), or otherwise on the display 305 (e.g., the light-passing layer 310). In some aspects, as shown, the object may be a finger (e.g., a fingertip) of a user of the device 300.

In some aspects, the device 300, when detecting that the object is contacting the display 305, may detect a location of the object on the display 305. The location may include a bounding area that encompasses all points of contact of the object with the display 305. In some aspects, the bounding area may be a box, another shape (e.g., a circle or a triangle), or multiple non-contiguous regions. For example, the bounding area may be multiple non-contiguous regions if the device 300 is to image multiple objects simultaneously. In some aspects, the device 300 may detect that the object is contacting the display 305 and/or detect the location of the object on the display 305 using a projected capacitive touch sensor (e.g., located beneath the light-passing layer 310).

As shown by reference number 410, the device 300 may illuminate a plurality of pixel regions 340 of the display 305. The device 300 may illuminate the plurality of pixel regions 340 based at least in part on detecting that the object is contacting the display 305. The device 300 may illuminate the plurality of pixel regions 340 sequentially (e.g., one-by-one), such that at a given time only one pixel region 340 is illuminated. For example, the device 300 may sequentially illuminate the plurality pixel regions 340 first by rows of pixels and second by columns of pixels; however, other sequences are possible. In some aspects, the device 300 may sequentially illuminate the plurality of pixel regions 340 without regard to rows or columns (e.g., illuminate the plurality of pixel regions 340 randomly, out from a middle pixel region 340, or the like).

Using the example shown in FIG. 4A, the device 300 may illuminate (shown by gray shading) and then darken the top-left pixel region 340, illuminate and then darken the top-middle pixel region 340, illuminate and then darken the top-right pixel region 340, illuminate and then darken the middle-left pixel region 340, illuminate and then darken the middle-middle pixel region 340, and so forth.

In some aspects, the plurality of pixel regions 340 may be illuminated using visible light (e.g., to a human). Thus, the sequential illumination of the plurality of pixel regions 340 may provide a visual indication to a user of the device 300 that the object is being imaged. In some aspects, a particular sequence used for the sequential illumination of the plurality of pixel regions 340 may provide a visual indication to a user of the device 300 that the object is being imaged.

To illuminate a particular pixel region 340, the device 300 may cause one or more of the emitters 315 to emit light (as well as perform additional operations). For example, the device 300 may cause emitters 315 corresponding to (e.g., configured to illuminate) the pixel region 340 to emit light. A pixel region 340 may include one or more pixels of the display 305. For example, a pixel region 340 may include one pixel of the display 305. As another example, a pixel region 340 may include multiple (e.g., four) pixels of the display 305 (e.g., arranged in a square or rectangle, in a line, or the like). Using a pixel region of multiple pixels may reduce oversampling during imaging, thereby reducing a time needed to image the object. The pixel regions 340 are shown enlarged for illustration purposes. In practice, the pixel regions 340 are much smaller relative to the display 305 from what is shown.

In some aspects, the device 300 may illuminate the plurality of pixel regions 340 based at least in part on detecting the location of the object on the display 305. In other words, the device 300 may illuminate the plurality of pixel regions 340 that correspond to the location of the object (e.g., and refrain from illuminating pixel regions that do not correspond to the location of the object). That is, the device 300 may illuminate the plurality of pixel regions 340 that are encompassed by the bounding area (e.g., and refrain from illuminating pixel regions that are not encompassed by the bounding area).

In some aspects, the device 300 may address a subset of a total set of pixels of the display 305 when sequentially illuminating the plurality of pixel regions 340, rather than writing to each row of the display 305 per refresh of the display 305. In other words, the device 300 may address (e.g., write to) a portion of pixels of the display 305, that is less than a total quantity of pixels of the display, when sequentially illuminating the plurality of pixel regions 340. In this way, a time needed (e.g., based on applicable display refresh rates) to image the object may be reduced relative to a full refresh of the display 305. For example, the device 300 may image the object in 200 milliseconds (ms) or less, 160 ms or less, 40 ms or less, or 15 ms or less (e.g., if the device 300 uses a refresh rate of 60 Hertz (Hz)). In some examples, the device 300 may image the object in 10 ms or less (e.g., if the device 300 uses a refresh rate of 120 Hz).

The location of the object may correspond to one or more rows of pixels of the display 305. In other words, the bounding area may encompass the one or more rows of pixels. In some aspects, when sequentially illuminating the plurality of pixel regions 340 (e.g., that are encompassed by the bounding area), the device 300 may address only the one or more rows of pixels, rather than performing a full refresh of the display 305. That is, the device 300 may write to the one or more rows and refrain from writing to a remainder of the rows of pixels. Thus, the device 300 may be capable of addressing (e.g., writing to) individual rows of pixels of the display 305 rather than performing a full refresh of all rows of pixels of the display 305. In this way, a time needed (e.g., based on applicable display refresh rates) to sequentially illuminate the plurality of pixel regions 340 is reduced relative to a full refresh of the display 305.

Furthermore, the location of the object may correspond to one or more rows of pixels and one or more columns of pixels of the display 305. In other words, the bounding area may encompass the one or more rows of pixels and the one or more columns of pixels. In some aspects, when sequentially illuminating the plurality of pixel regions 340 (e.g., that are encompassed by the bounding area), the device 300 may address only the one or more rows of pixels and the one or more columns of pixels, rather than performing a full refresh of the display 305 (or rather than addressing whole individual rows of pixels). That is, the device 300 may write to pixels of the one or more rows and the one or more columns (e.g., pixels at an intersection of the one or more rows and the one or more columns) and refrain from writing to a remainder of the pixels. Thus, the device 300 may be capable of addressing (e.g., writing to) individual pixels of the display 305 (e.g., the device 300 may be capable of random access of the pixels). In this way, a time needed (e.g., based on applicable screen refresh rates) to sequentially illuminate the plurality of pixel regions 340 is reduced relative to a full refresh of the display 305 (as well as reduced relative to addressing whole individual rows of pixels).

As shown in FIG. 4B, and by reference number 415, the device 300 (e.g., using the photosensors 335) may detect light reflected (e.g., flux) from at least a portion of the object. Illumination of a pixel region 340 may emit light toward the object, and the light may reflect (e.g., turn and scatter) from the object. For example, the light may reflect from fingerprint ridges of a finger (e.g., which may be detected as a first signal at a photosensor 335), whereas the light may be absorbed (e.g., producing minimal or no reflection) from fingerprint valleys of a finger (e.g., which may be detected as a second signal at a photosensor 335). Some of the light may reflect from the object at an angle that traps the light (e.g., results in total internal reflection) within the light-passing layer 310 (e.g., the light-passing layer 310 acts as a light guide). Thus, light reflected from at least a portion of the object may be guided to one or more of the photosensors 335 via the light-passing layer 310.

The device 300 may detect light reflected (e.g., flux) from the object for each sequential illumination of a pixel region 340 of the plurality of pixel regions 340. In other words, the device 300 may sequentially detect light reflected from the object per illumination of a pixel region 340. Accordingly, the device 300 may obtain, using the photosensors 335, a set of data relating to light that is reflected (e.g., flux) from the object based at least in part on sequentially illuminating the plurality of pixel regions 340. That is, the set of data may include respective data for each sequential illumination of the plurality of pixel regions 340. For example, a photosensor 335 may produce an electrical signal based at least in part on the light detected by the photosensor 335, and the device 300 (e.g., using a processor) may generate data for the set of data based at least in part on the electrical signal.

In some aspects, the data for a sequential illumination may include separate data for multiple light wavelengths. In particular, a pixel of the display 305 may include multiple sub-pixels for different light wavelengths. For example, the pixel may include a first sub-pixel for a first light wavelength (e.g., a red light wavelength), a second sub-pixel for a second light wavelength (e.g., a green light wavelength), and a third sub-pixel for a third light wavelength (e.g., a blue light wavelength). In some aspects, the pixel may include more than three sub-pixels, such as four sub-pixels. In some aspects, a pixel region 340 is illuminated, as described above, using multiple light wavelengths (e.g., the multiple sub-pixels are concurrently illuminated). Moreover, as described above, the photosensors 335 may include multiple sets of photosensors 335 (e.g., each set including one or more photosensors 335) that are filtered for transmittance of respective light wavelengths. Accordingly, each set of photosensors 335 may respectively detect light reflected from the object for only one light wavelength, and the data obtained by the device 300 for each sequential illumination may include separate data for the multiple light wavelengths. In this way, a time needed to image the object can be reduced (e.g., by a factor corresponding to the quantity of light wavelengths that are separately detected).

In some aspects, the device 300 may detect additional characteristics of the object, and obtain additional data relating to the object, through the use of different light wavelengths. For example, the device 300 may sequentially illuminate the plurality of pixel regions 340, as described above, at a first light wavelength. While sequentially illuminating the plurality of pixel regions 340, the device 300 may illuminate one or more pixels of the display 305 at a second light wavelength. Here, the device 300 may illuminate the one or more pixels at the second light wavelength concurrently.

In some aspects, the device 300 may obtain liveness data based at least in part on illuminating the one or more pixels at the second light wavelength (e.g., a green light wavelength). For example, light at the second light wavelength that is reflected (e.g., scattered) from the object may be modulated by blood pulsing in the object. Accordingly, the device 300 may detect (e.g., using one or more photosensors 335 filtered for the second light wavelength) the reflected light at the second light wavelength, and the device 300 may obtain the liveness data based at least in part on the reflected light at the second light wavelength that is detected by the device 300. The liveness data may include heart rate information and/or blood pressure pulse shape information, among other examples. Thus, the device 300 may use the liveness data to identify whether a user of the device 300 is a living person, to identify the user of the device 300, or the like.

Additionally, or alternatively, the device 300 may obtain fluorescence data based at least in part on illuminating the one or more pixels at the second light wavelength (e.g., a blue light wavelength). For example, light at the second light wavelength may excite fluorescence from the object. Accordingly, the device 300 may detect the fluorescence (e.g., using one or more photosensors 335 filtered for a light wavelength associated with the fluorescence), and the device 300 may obtain the fluorescence data based at least in part on the fluorescence that is detected by the device 300. The fluorescence data may indicate, for the object, the presence of a particular marker, the presence of a particular bacteria or virus, or the like.

As shown in FIG. 4C, and by reference number 420, the device 300 may generate an image (e.g., an image or image data that corresponds to the image) of at least a portion of the object based at least in part on the set of data obtained by the device 300. For example, the device 300 (e.g., using a processor of the device) may process the respective data for each sequential illumination of the plurality of pixel regions 340 in order to generate the image. That is, the device 300 may organize the respective data for each sequential illumination of the plurality of pixel regions 340 into an image (e.g., based at least in part on the locations of the sequential illuminations).

In this way, the device 300 may image an object that is placed anywhere on the display 305 of the device 300. Moreover, the device 300 incorporates a simple design that images the object using relatively few sensors and with great speed.

In some aspects, the device 300 may perform one or more operations based at least in part on generating the image. For example, to perform the one or more operations, the device 300 may determine an authentication of a user based at least in part on the image. As an example, if the object is a finger of the user, the device 300 may compare the image of the finger to a stored image of a finger associated with an authorized user of the device. Additionally, or alternatively, the device 300 may determine fingerprint information based at least in part on the image of the finger, and the device 300 may compare the fingerprint information to stored fingerprint information associated with an authorized user of the device. Based at least in part on the image corresponding to the stored image and/or the fingerprint information corresponding to the stored fingerprint information, the device 300 may determine that the user is authenticated (e.g., to access one or more functions of the device 300 that are unavailable to unauthenticated users). In some aspects, additionally or alternatively, the device 300 may determine the authentication of the user based at least in part on the liveness data and/or the fluorescence data.

In some aspects, to perform the one or more operations, the device 300 may determine one or more dimensions of the object, determine one or more features of the object, identify the object, or the like, based at least in part on the image. In some aspects, to perform the one or more operations, the device 300 may determine biological information associated with a user based at least in part on the liveness data and/or the fluorescence data.

As indicated above, FIGS. 4A-4C are provided as an example. Other examples may differ from what is described with respect to FIGS. 4A-4C.

FIG. 5 is a flowchart of an example process 500 associated with imaging an object on a display, in accordance with the present disclosure. In some aspects, one or more process blocks of FIG. 5 may be performed by a device (e.g., device 300, user device 110, or the like). In some aspects, one or more process blocks of FIG. 5 may be performed by another device or a group of devices separate from or including the device, such as a wireless communication device (e.g., wireless communication device 120). Additionally, or alternatively, one or more process blocks of FIG. 5 may be performed by one or more components of device 200, such as processor 210, memory 215, storage component 220, input component 225, output component 230, communication interface 235, and/or sensor 240.

As shown in FIG. 5, process 500 may include detecting that an object is contacting a display of a device (block 510). For example, the device may detect that an object is contacting a display of the device, as described above.

As further shown in FIG. 5, process 500 may include illuminating, based at least in part on detecting that the object is contacting the display, a plurality of pixel regions of the display, wherein the plurality of pixel regions are illuminated sequentially (block 520). For example, the device may illuminate, based at least in part on detecting that the object is contacting the display, a plurality of pixel regions of the display, as described above. In some aspects, the plurality of pixel regions are illuminated sequentially.

As further shown in FIG. 5, process 500 may include obtaining, using one or more photosensors, a set of data relating to light that is reflected from at least a portion of the object based at least in part on illuminating the plurality of pixel regions, wherein the set of data includes respective data for each sequential illumination of the plurality of pixel regions (block 530). For example, the device may obtain, using one or more photosensors, a set of data relating to light that is reflected from at least a portion of the object based at least in part on illuminating the plurality of pixel regions, as described above. In some aspects, the set of data includes respective data for each sequential illumination of the plurality of pixel regions.

As further shown in FIG. 5, process 500 may include generating an image of at least the portion of the object based at least in part on the set of data (block 540). For example, the device may generate an image of at least the portion of the object based at least in part on the set of data, as described above.

Process 500 may include additional aspects, such as any single aspect or any combination of aspects described below and/or in connection with one or more other processes described elsewhere herein.

In a first aspect, the object is a finger of a user of the device, and process 500 further includes determining an authentication of the user based at least in part on the image.

In a second aspect, alone or in combination with the first aspect, the light reflected from at least the portion of the object is guided to the one or more photosensors via a light-passing layer of the display of the device.

In a third aspect, alone or in combination with one or more of the first and second aspects, detecting that the object is in contact with the display includes detecting a location of the object on the display.

In a fourth aspect, alone or in combination with one or more of the first through third aspects, the plurality of pixel regions that are illuminated include only pixel regions that correspond to a location of the object on the display.

In a fifth aspect, alone or in combination with one or more of the first through fourth aspects, illuminating the plurality of pixel regions includes addressing a portion of pixels of the display that is less than a total quantity of pixels of the display.

In a sixth aspect, alone or in combination with one or more of the first through fifth aspects, a pixel region, of the plurality of pixel regions, includes multiple pixels of the display.

In a seventh aspect, alone or in combination with one or more of the first through sixth aspects, a pixel region, of the plurality of pixel regions, is illuminated using multiple light wavelengths, and the respective data for each sequential illumination of the plurality of pixel regions includes separate data for the multiple light wavelengths obtained using sets of the one or more photosensors that are respectively filtered for the multiple light wavelengths.

In an eighth aspect, alone or in combination with one or more of the first through seventh aspects, the plurality of pixel regions are illuminated at a first light wavelength, and process 500 further includes illuminating one or more pixels of the display at a second light wavelength, and obtaining at least one of liveness data or fluorescence data associated with the object based at least in part on illuminating the one or more pixels.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

The following provides an overview of some Aspects of the present disclosure:

Aspect 1: A method, comprising: detecting, by a device, that an object is contacting a display of the device; illuminating, by the device, based at least in part on detecting that the object is contacting the display, a plurality of pixel regions of the display, wherein the plurality of pixel regions are illuminated sequentially; obtaining, by the device, using one or more photosensors, a set of data relating to light that is reflected from at least a portion of the object based at least in part on illuminating the plurality of pixel regions, wherein the set of data includes respective data for each sequential illumination of the plurality of pixel regions; and generating, by the device, an image of at least the portion of the object based at least in part on the set of data.

Aspect 2: The method of Aspect 1, wherein the object is a finger of a user of the device, and wherein the method further comprises: determining an authentication of the user based at least in part on the image.

Aspect 3: The method of any of Aspects 1-2, wherein the light reflected from at least the portion of the object is guided to the one or more photosensors via a light-passing layer of the display of the device.

Aspect 4: The method of any of Aspects 1-3, wherein detecting that the object is in contact with the display comprises: detecting a location of the object on the display.

Aspect 5: The method of any of Aspects 1-4, wherein the plurality of pixel regions that are illuminated include only pixel regions that correspond to a location of the object on the display.

Aspect 6: The method of any of Aspects 1-5, wherein illuminating the plurality of pixel regions comprises: addressing a portion of pixels of the display that is less than a total quantity of pixels of the display.

Aspect 7: The method of any of Aspects 1-6, wherein a pixel region, of the plurality of pixel regions, includes multiple pixels of the display.

Aspect 8: The method of any of Aspects 1-7, wherein a pixel region, of the plurality of pixel regions, is illuminated using multiple light wavelengths, and wherein the respective data for each sequential illumination of the plurality of pixel regions includes separate data for the multiple light wavelengths obtained using sets of the one or more photosensors that are respectively filtered for the multiple light wavelengths.

Aspect 9: The method of any of Aspects 1-8, wherein the plurality of pixel regions are illuminated at a first light wavelength, and wherein the method further comprises: illuminating one or more pixels of the display at a second light wavelength; and obtaining at least one of liveness data or fluorescence data associated with the object based at least in part on illuminating the one or more pixels.

Aspect 10: An apparatus at a device, comprising a processor; memory coupled with the processor; and instructions stored in the memory and executable by the processor to cause the apparatus to perform the method of one or more of Aspects 1-9.

Aspect 11: A device, comprising a memory and one or more processors coupled to the memory, the one or more processors configured to perform the method of one or more of Aspects 1-9.

Aspect 12: An apparatus, comprising at least one means for performing the method of one or more of Aspects 1-9.

Aspect 13: A non-transitory computer-readable medium storing code, the code comprising instructions executable by a processor to perform the method of one or more of Aspects 1-9.

Aspect 14: A non-transitory computer-readable medium storing a set of instructions, the set of instructions comprising one or more instructions that, when executed by one or more processors of a device, cause the device to perform the method of one or more of Aspects 1-9.

Aspect 15: A device, comprising: a light-passing layer; one or more emitters configured to emit light through the light-passing layer, wherein the one or more emitters are configured to illuminate a plurality of pixels of a display; and one or more photosensors optically coupled to an edge of the light-passing layer, wherein the one or more photosensors are configured to detect the light reflected from an object and guided to the one or more photosensors via the light-passing layer.

Aspect 16: The device of Aspect 15, wherein the one or more photosensors each comprise a single-pixel photosensor.

Aspect 17: The device of any of Aspects 15-16, wherein the one or more photosensors each comprise a lens-less photosensor.

Aspect 18: The device of any of Aspects 15-17, further comprising: an adhesive layer between the light-passing layer and the one or more emitters, wherein the adhesive layer has a lower refractive index than the light-passing layer.

Aspect 19: The device of any of Aspects 15-18, wherein the light-passing layer comprises glass.

Aspect 20: The device of any of Aspects 15-19, wherein the one or more photosensors include a first set of photosensors filtered for light of a first wavelength, a second set of photosensors filtered for light of a second wavelength, and a third set of photosensors filtered for light of a third wavelength.

Aspect 21: The device of any of Aspects 15-20, further comprising: a memory; and one or more processors, coupled to the memory, configured to: detect that an object is contacting a display of the device; illuminate, based at least in part on detecting that the object is contacting the display, a plurality of pixel regions of the display, wherein the plurality of pixel regions are illuminated sequentially; obtain, using one or more photosensors, a set of data relating to light that is reflected from at least a portion of the object based at least in part on illuminating the plurality of pixel regions, wherein the set of data includes respective data for each sequential illumination of the plurality of pixel regions; and generate an image of at least the portion of the object based at least in part on the set of data.

Aspect 22: The device of Aspect 21, wherein the object is a finger of a user of the device, and wherein the one or more processors are further configured to: determine an authentication of the user based at least in part on the image.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   detecting, by a device, that an object is contacting anywhere on a display of the device;
   illuminating, by the device, based at least in part on detecting that the object is contacting anywhere on the display, a plurality of pixel regions of the display,
      wherein the plurality of pixel regions are illuminated sequentially, and
      wherein, when the plurality of pixel regions are illuminated sequentially, only one pixel region, of the plurality of pixel regions, is illuminated at a given time;
   obtaining, by the device, using one or more photosensors, a set of data relating to light that is reflected from at least a portion of the object based at least in part on illuminating the plurality of pixel regions,
      wherein the set of data includes respective data for each sequential illumination of the plurality of pixel regions; and
   generating, by the device, an image of at least the portion of the object based at least in part on the set of data.

2. The method of claim 1, wherein the object is a finger of a user of the device, and
   wherein the method further comprises:
      determining an authentication of the user based at least in part on the image.

3. The method of claim 1, wherein the light reflected from at least the portion of the object is guided to the one or more photosensors via a light-passing layer of the display of the device.

4. The method of claim 1, wherein detecting that the object is contacting anywhere on the display comprises:
   detecting a location of the object on the display.

5. The method of claim 1, wherein the plurality of pixel regions that are illuminated include only pixel regions that correspond to a location of the object on the display.

6. The method of claim 1, wherein illuminating the plurality of pixel regions comprises:
   addressing a portion of pixels of the display that is less than a total quantity of pixels of the display.

7. The method of claim 1, wherein a pixel region, of the plurality of pixel regions, includes multiple pixels of the display.

8. The method of claim 1, wherein a pixel region, of the plurality of pixel regions, is illuminated using multiple light wavelengths, and
   wherein the respective data for each sequential illumination of the plurality of pixel regions includes separate data for the multiple light wavelengths obtained using sets of the one or more photosensors that are respectively filtered for the multiple light wavelengths.

9. The method of claim 1, wherein the plurality of pixel regions are illuminated at a first light wavelength, and
   wherein the method further comprises:
      illuminating one or more pixels of the display at a second light wavelength; and
      obtaining at least one of liveness data or fluorescence data associated with the object based at least in part on illuminating the one or more pixels.

10. A device, comprising:
    a light-passing layer;
    one or more emitters configured to emit light through the light-passing layer,
       wherein the one or more emitters are configured to illuminate a plurality of pixel regions of a display based at least in part on detecting that an object is placed anywhere on the display,
       wherein the plurality of pixel regions are illuminated sequentially, and
       wherein, when the plurality of pixel regions are illuminated sequentially, only one pixel region, of the plurality of pixel regions, is illuminated at a given time; and
    one or more photosensors optically coupled to an edge of the light-passing layer,
       wherein the one or more photosensors are configured to detect the light reflected from an object and guided to the one or more photosensors via the light-passing layer.

11. The device of claim 10, wherein the one or more photosensors each comprise a single-pixel photosensor.

12. The device of claim 10, wherein the one or more photosensors each comprise a lens-less photosensor.

13. The device of claim 10, further comprising:
    an adhesive layer between the light-passing layer and the one or more emitters, wherein the adhesive layer has a lower refractive index than the light-passing layer.

14. The device of claim 10, wherein the light-passing layer comprises glass.

15. The device of claim 10, wherein the one or more photosensors include a first set of photosensors filtered for light of a first wavelength, a second set of photosensors filtered for light of a second wavelength, and a third set of photosensors filtered for light of a third wavelength.

16. The device of claim 10, further comprising:
    a memory; and
    one or more processors, coupled to the memory, configured to:
       detect that the object is contacting anywhere on the display,
          wherein the plurality of pixel regions are illuminated based at least in part on detecting that the object is contacting anywhere on the display;

obtain, using the one or more photosensors, a set of data relating to the light that is reflected from at least a portion of the object based at least in part on illuminating the plurality of pixel regions,
   wherein the set of data includes respective data for each sequential illumination of the plurality of pixel regions; and
generate an image of at least the portion of the object based at least in part on the set of data.

17. The device of claim 16, wherein the object is a finger of a user of the device, and
wherein the one or more processors are further configured to:
   determine an authentication of the user based at least in part on the image.

18. A non-transitory computer-readable medium storing a set of instructions, the set of instructions comprising:
one or more instructions that, when executed by one or more processors of a device, cause the device to:
   detect that an object is contacting anywhere on a display of the device;
   illuminate, based at least in part on detecting that the object is contacting anywhere on the display, a plurality of pixel regions of the display,
      wherein the plurality of pixel regions are illuminated sequentially, and
      wherein, when the plurality of pixel regions are illuminated sequentially, only one pixel region, of the plurality of pixel regions, is illuminated at a given time;
   obtain, using one or more photosensors, a set of data relating to light that is reflected from at least a portion of the object based at least in part on illuminating the plurality of pixel regions,
      wherein the set of data includes respective data for each sequential illumination of the plurality of pixel regions; and
   generate an image of at least the portion of the object based at least in part on the set of data.

19. The non-transitory computer-readable medium of claim 18, wherein the object is a finger of a user of the device, and
wherein the one or more instructions further cause the device to:
   determine an authentication of the user based at least in part on the image.

20. The non-transitory computer-readable medium of claim 18, wherein the one or more instructions, that cause the device to detect that the object is contacting anywhere on the display, cause the device to:
   detect a location of the object on the display.

21. The non-transitory computer-readable medium of claim 18, wherein the plurality of pixel regions that are illuminated include only pixel regions that correspond to a location of the object on the display.

22. The non-transitory computer-readable medium of claim 18, wherein the one or more instructions, that cause the device to illuminate the plurality of pixel regions, cause the device to:
   address a portion of pixels of the display that is less than a total quantity of pixels of the display.

23. The non-transitory computer-readable medium of claim 18, wherein a pixel region, of the plurality of pixel regions, includes multiple pixels of the display.

24. An apparatus, comprising:
means for detecting that an object is contacting anywhere on a display of the apparatus;
means for illuminating, based at least in part on detecting that the object is contacting anywhere on the display, a plurality of pixel regions of the display,
   wherein the plurality of pixel regions are illuminated sequentially, and
   wherein, when the plurality of pixel regions are illuminated sequentially, only one pixel region, of the plurality of pixel regions, is illuminated at a given time;
means for obtaining, using one or more photosensors, a set of data relating to light that is reflected from at least a portion of the object based at least in part on illuminating the plurality of pixel regions,
   wherein the set of data includes respective data for each sequential illumination of the plurality of pixel regions; and
means for generating an image of at least the portion of the object based at least in part on the set of data.

25. The apparatus of claim 24, wherein the object is a finger of a user of the apparatus, and
wherein the apparatus further comprises:
   means for determining an authentication of the user based at least in part on the image.

26. The apparatus of claim 24, wherein the means for detecting that the object is contacting anywhere on the display comprises:
   means for detecting a location of the object on the display.

27. The apparatus of claim 24, wherein the plurality of pixel regions that are illuminated include only pixel regions that correspond to a location of the object on the display.

28. The apparatus of claim 24, wherein the means for illuminating the plurality of pixel regions comprises:
   means for addressing a portion of pixels of the display that is less than a total quantity of pixels of the display.

29. The apparatus of claim 24, wherein a pixel region, of the plurality of pixel regions, includes multiple pixels of the display.

30. The apparatus of claim 24, wherein a pixel region, of the plurality of pixel regions, is illuminated using multiple light wavelengths, and
wherein the respective data for each sequential illumination of the plurality of pixel regions includes separate data for the multiple light wavelengths obtained using sets of the one or more photosensors that are respectively filtered for the multiple light wavelengths.

* * * * *